United States Patent
Chan

(10) Patent No.: US 8,797,088 B2
(45) Date of Patent: Aug. 5, 2014

(54) CHARGE PUMP FEEDBACK CONTROL DEVICE AND METHOD USING THE SAME

(75) Inventor: Cheng-Pang Chan, HsinChu (TW)

(73) Assignee: Realtek Semiconductor Corp., Hsinchu (TW)

(*) Notice: Subject to any disclaimer, the term of this patent is extended or adjusted under 35 U.S.C. 154(b) by 0 days.

(21) Appl. No.: 13/457,052

(22) Filed: Apr. 26, 2012

(65) Prior Publication Data
US 2012/0274394 A1 Nov. 1, 2012

(30) Foreign Application Priority Data

Apr. 27, 2011 (TW) .................................. 100114623

(51) Int. Cl.
*G05F 1/10* (2006.01)
(52) U.S. Cl.
USPC ........................................... 327/536; 327/540
(58) Field of Classification Search
CPC ......... H03L 7/0891; H03L 7/093; H02M 3/07
USPC ............................ 327/536, 537, 540, 541, 543
See application file for complete search history.

(56) References Cited

U.S. PATENT DOCUMENTS

| | | | | |
|---|---|---|---|---|
| 5,426,334 A | * | 6/1995 | Skovmand | 327/427 |
| 6,359,947 B1 | * | 3/2002 | Rao | 375/374 |
| 6,791,212 B2 | * | 9/2004 | Pulvirenti et al. | 307/113 |
| 7,656,221 B2 | * | 2/2010 | Maejima | 327/534 |
| 7,667,529 B2 | | 2/2010 | Consuelo et al. | |
| 7,902,905 B2 | * | 3/2011 | Maejima | 327/534 |
| 7,928,796 B2 | * | 4/2011 | Namekawa | 327/537 |
| 2003/0122610 A1 | * | 7/2003 | Zeng et al. | 327/536 |
| 2009/0115494 A1 | * | 5/2009 | Consuelo et al. | 327/536 |

OTHER PUBLICATIONS

CN Office Action dated Mar. 4, 2014.

* cited by examiner

*Primary Examiner* — Lincoln Donovan
*Assistant Examiner* — Jung H Kim
(74) *Attorney, Agent, or Firm* — McClure, Qualey & Rodack, LLP

(57) ABSTRACT

Charge pump feedback control device and method are provided. The device is coupled to the charge pump unit which receives an input voltage so as to generate an output voltage and has switches and at least one capacitor, the device includes: a compensation unit, a modulation unit, and a phase control unit. The compensation unit receives the output voltage, compensates the output voltage for stability, and generates an error signal. The modulation unit receives the error signal, modulates the error signal, and correspondingly generates a modulation signal. The phase control unit receives the modulation signal so as to generate phase signal, and controls the plurality of switches of the charge pump unit according to the plurality of phase signal so as to generate the output voltage through the input voltage charging/discharging at least one capacitor of the charge pump unit.

6 Claims, 17 Drawing Sheets

CHARGE PUMP FEEDBACK CONTROL DEVICE AND METHOD USING THE SAME

CROSS-REFERENCES TO RELATED APPLICATIONS

This non-provisional application claims priority under 35 U.S.C. §119(a) on Patent Application No. 100114623 filed in Taiwan, R.O.C. on Apr. 27, 2011 the entire contents of which are hereby incorporated by reference.

BACKGROUND

1. Technical Field

The disclosure relates to a charge pump, and more particularly, to a charge pump feedback control device and method.

2. Related Art

Recently, portable electronics products have flourished in a variety of fields, and power management issues have arisen as a consequence. Due to the limited electric power of the portable electronics products, the power management IC has become a key component for managing power consumption effectively. A power management IC transforms a voltage of the battery into the different operation voltages of the sub-circuits of the portable electronics product, such as transforming 3.3V to 1.2V, or 3.3V to 2.5V, etc. The design rules for the power management IC's voltage transformation are high efficiency, high precision, low noise, and small volume. Generally speaking, there are three kinds of voltage transformer inside the power management IC: switching regulator, linear regulator, and charge pump regulator, of which the charge pump has advantages of smaller volume and lower design cost than the switching regulator and linear regulator.

A charge pump regulator has a capacitor array core, which is a circuit designed using several switches and capacitors. By controlling the switches to be opened/closed to change the connection relationship of the capacitors, the capacitors are charged or discharged by the connection and the power is transferred as different voltages. Generally, charge pumps are separated into open loop and close loop control schemas.

Usually, a conventional charge pump adopts the open loop schema. Please refer to FIG. 1A, in which the conventional charge pump includes: charge pump unit 50 and controller 60. Please also refer to FIG. 1B, in which the charge pump unit 50 includes a first switch S1, a second switch S2, a third switch S3, a fourth switch S4, a capacitor C1, where the controller 60 generates several phase control signal for the charge pump unit 50, please refer to FIG. 1C. The controller 60 generates a first phase for the charge pump unit 50 to close the switches S1 and S2, then the input voltage Vi charges capacitors C0 and C1, please refer to FIG. 1D. Please refer to FIG. 1E, in which controller 60 generates a second phase for the charge pump unit 50 to close switches S3 and S4, then the capacitor C1 discharges the resistor RL and capacitor C0. The ratio of the output voltage Vo and the input voltage Vi is derived thus:

$$Q_1^- = (Vi - Vo) * C1 \quad \text{F.1}$$

$$Q_1^+ = Vo * C1 \quad \text{F.2}$$

$$Q_1^- - Q_1^+ = I * T \quad \text{F.3}$$

$$I = \frac{Vo}{RL}, \text{ and } T = \frac{1}{fs},$$

for F.3

$$(Vi - Vo - Vo) * C1 = \frac{Vo}{RL} * \frac{1}{fs},$$

then, F.4 is acquired as below:

$$\frac{V_o}{V_i} = \frac{C_1}{2 \cdot C_1 + \frac{1}{R_L \cdot f_s}} \quad \text{F.4}$$

From the derivation of F.4, the relationship of the output voltage Vo and the input voltage Vi of the charge pump unit 50 are related with a switching frequency fs and a load RL. When RL is fixed, a gain of the output voltage Vo and the input voltage Vi is related with the switching frequency fs and the capacitance of the capacitor C1 according to F.4. Due to the open loop schema of the conventional charge pump regulator, when the switching frequency fs is fixed, the gain of the output voltage Vo divide input voltage Vi changes following the impedance of the resistor RL changes. That is, Vo=gain*Vi; when the output voltage Vo changes following the gain changes, the ripple voltage variation becomes too large. For this reason, the charge pump under open loop schema is only suitable for a fixed load, the output voltage Vo changes following the load changes.

Therefore, two problems typically happen when using the conventional charge pump under an open loop schema in which the switching frequency fs is fixed.

Firstly, when the switching frequency fs is fixed, if the impedance of the load RL became small, the load current becomes large and the output voltage Vo becomes small when derived by F.4. If the situation continues without control, the output voltage becomes too small to disable the connected circuit.

Secondly, when the switching frequency fs is fixed, if the impedance of the load RL became large, the load current becomes small and the output voltage Vo becomes large when derived by F.4. If the situation continues without control, the output voltage becomes too large to damage the connected components of the circuit.

Furthermore, the close loop schema charge pump design is developed to resolve the problems of open loop schema. The close loop schema charge pump has a comparative circuit to be used as a feedback control for the switching of the charge pump. Furthermore, the close loop schema charge pump adopts a feedback circuit to compare a reference voltage to generate at least one clock signal according to an input voltage. The clock signal controls switching of the charge pump to charge/discharge at least one capacitor for boosting or bucking the output voltage. The output voltage is then stable, and includes less ripple signal.

Another conventional charge pump under close loop schema is using a voltage controlled oscillator (VCO) or current controlled oscillator (CCO) to achieve close loop control. Through detecting the variation of the load voltage or current of the output end according to a detection and control circuit, and generating at least one clock signal by VCO or CCO to control switching of the charge pump to charge/discharge at least one capacitor for boosting or bucking the output voltage, the output voltage is stable and includes less ripple signal.

However, the conventional close loop schema charge pump also has several problems.

Firstly, if the conventional charge pump uses the close loop schema and the load changes, the charge pump is not able to adjust the output voltage instantly with precision.

Secondly, if the conventional charge pump uses the close loop schema and adopts a comparator for comparing the output voltage and a reference voltage to generate a feedback control signal, the feedback control signal is used to generate at least one clock signal for switching the charge pump. Such a comparator type schema results in an unstable system.

SUMMARY

A charge pump feedback control device is, coupled to a charge pump unit which receives an input voltage so as to generate an output voltage and has switches and at least one capacitor, the device includes: a compensation unit, a modulation unit, and a phase control unit. The compensation unit is coupled to the charge pump unit, receiving the output voltage, compensating the output voltage for stability, and generating an error signal. The modulation unit is coupled to the compensation unit, receives the error signal, modulates the error signal, and correspondingly generates a modulation signal. The phase control unit is coupled to the modulation unit, receives the modulation signal so as to generate phase signal, and controls the plurality of switches of the charge pump unit according to the plurality of phase signal so as to generate the output voltage through the input voltage charging/discharging at least one capacitor of the charge pump unit.

A charge pump feedback control method, includes: controlling an input voltage to charge/discharge at least one capacitor for generating an output voltage according to phase signal; compensating the output voltage to generate an error signal; modulating the error signal to generate a modulation signal; and generating the plurality of phase signals according to the modulation signal.

A charge pump feedback control device, coupled to a charge pump unit which receives an input voltage so as to generate an output voltage and has switches and at least one capacitor, the device includes: a comparator, a modulation unit, and a phase control unit. The comparator is coupled to the charge pump unit, wherein an output end of the comparator is coupled to the at least one capacitor and generates a comparative signal after comparing the output voltage and a reference voltage. The modulation unit is coupled to the comparator, receives the error signal, modulates the error signal, and correspondingly generates a modulation signal of pulse skipping modulation. The phase control unit is coupled to the modulation unit, receives the modulation signal so as to generate phase signal, and controls the plurality of switches of the charge pump unit according to the plurality of phase signal so as to generate the output voltage through the input voltage charging/discharging the at least one capacitor of the charge pump unit.

A charge pump feedback control method, includes: controlling an input voltage to charge/discharge at least one capacitor for generating an output voltage according to phase signal; comparing a voltage level of the output voltage to generate an comparative signal; generating a modulation signal through skipping the output voltage according to the comparative signal; and generating the plurality of phase signal according to the modulation signal.

In order to make these and other objectives, features and advantages of the disclosure comprehensible, preferred embodiments accompanied with figures are described in detail below.

BRIEF DESCRIPTION OF THE DRAWINGS

The disclosure will become more fully understood from the detailed description given herein below for illustration only, and thus not limitative of the present invention, wherein.

DETAILED DESCRIPTION

The disclosure is to setup a device and method for feedback control of a charge pump unit in a charge pump regulator. By adapting an output voltage of the charge pump unit through feedback control, the charge pump regulator has better output voltage and a wider dynamic range of load capacity (Ex. 1 mA~100 mA). The disclosure compensates the charge pump regulator through a compensation unit, so that the output voltage of the charge pump regulator is stabilized with lower noise. The device also generates a modulation signal through signal modulations such as pulse frequency modulation (PFM) or pulse skipping modulation (PSM), and outputs multiple phase signals to control different charge pump architectures according to the modulation signal.

Figure 2A:
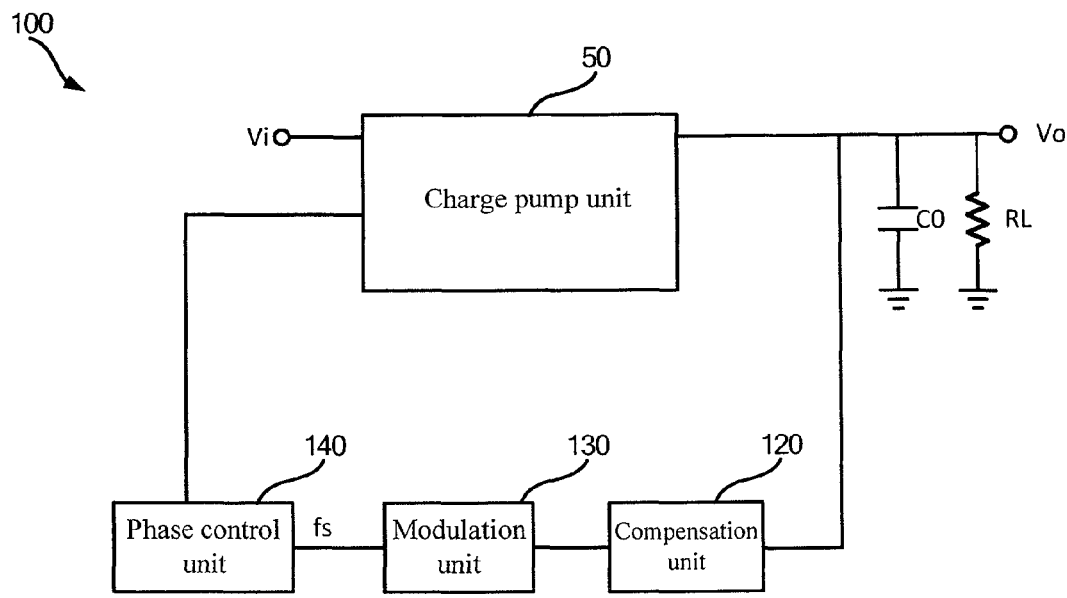
FIG. 2A is an exemplified functional block diagram of the embodiment of the disclosed charge pump feedback control device.

Please refer to FIG. 2A, in which the charge pump feedback control device 100 includes: a charge pump unit 50, a compensation unit 120, a modulation unit 130, and a phase control unit 140. The compensation unit 120 is coupled to the charge pump unit 50, and receiving the output voltage, compensating the output voltage for stability, and generating an error signal. The modulation unit 130 is coupled to the compensation unit 120, receiving the error signal, modulating the error signal, and correspondingly generating a modulation signal. The phase control unit 140 is coupled to the modulation unit 130, receiving the modulation signal so as to generate multiple phase signals, controlling the plurality of switches of the charge pump unit 50 according to the plurality of phase signal in order to generate the output voltage through the input voltage charging/discharging the at least one capacitor of the charge pump unit.

Figure 2B:
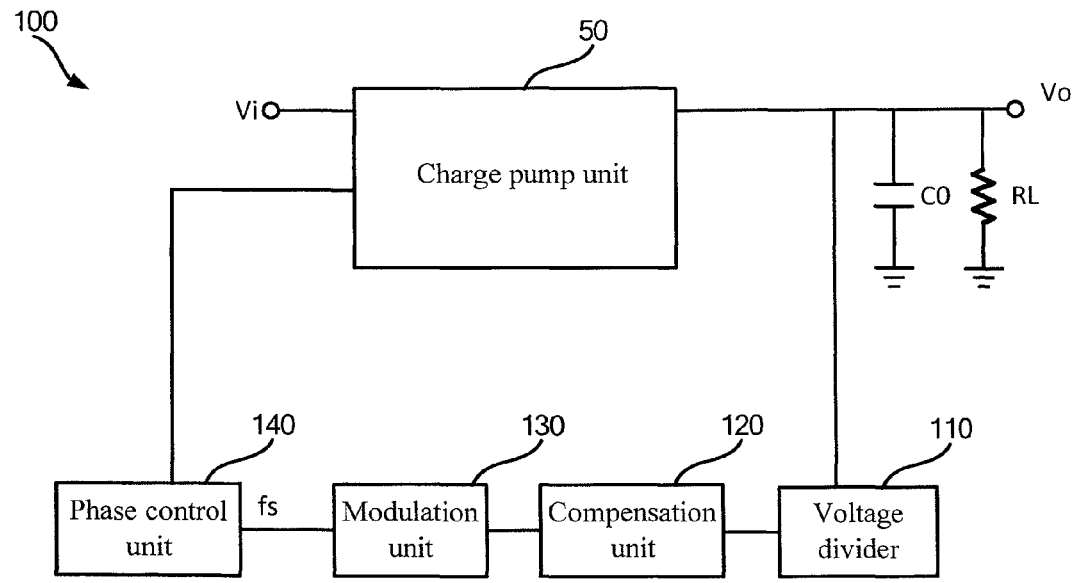
FIG. 2B is the other exemplified functional block diagram of the embodiment of the disclosed charge pump feedback control device.

Please refer to FIG. 2B, in which a voltage divider 110 is coupled between the charge pump unit 50 and the compensation unit 120. The voltage divider 100 receives the output voltage generated from the charge pump unit 50, and divides the output voltage for the compensation unit 120 through a first resistor and a second resistor.

Figure 1A:
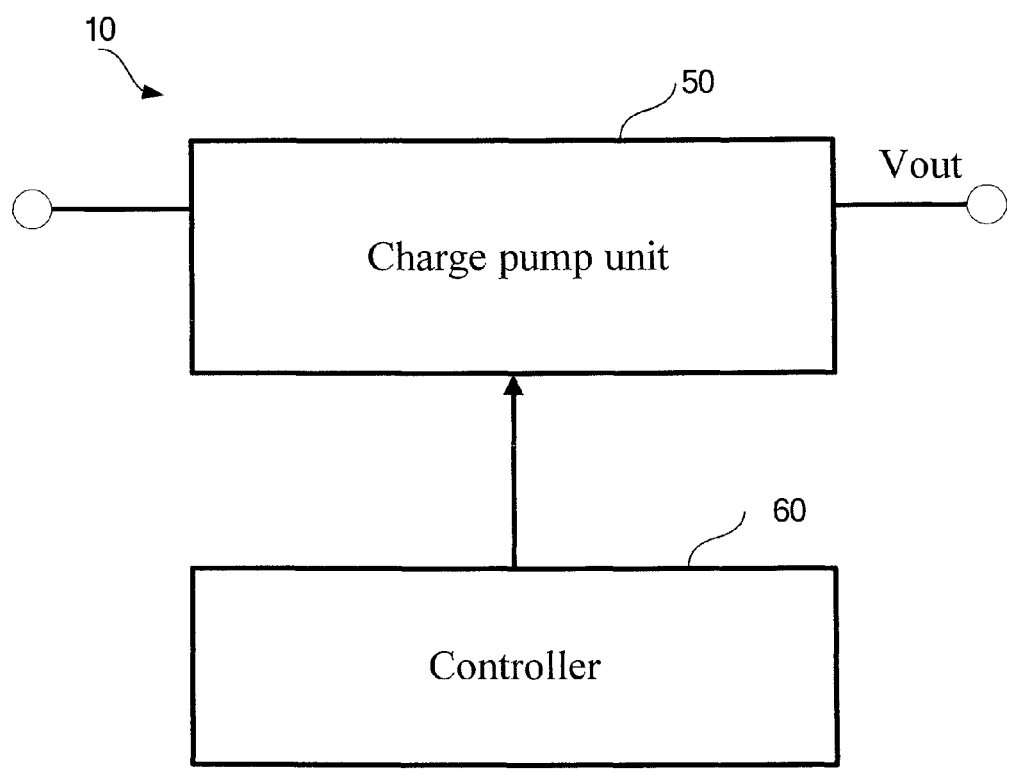
FIG. 1A is a functional block diagram of a conventional charge pump regulator.
Figure 1B:
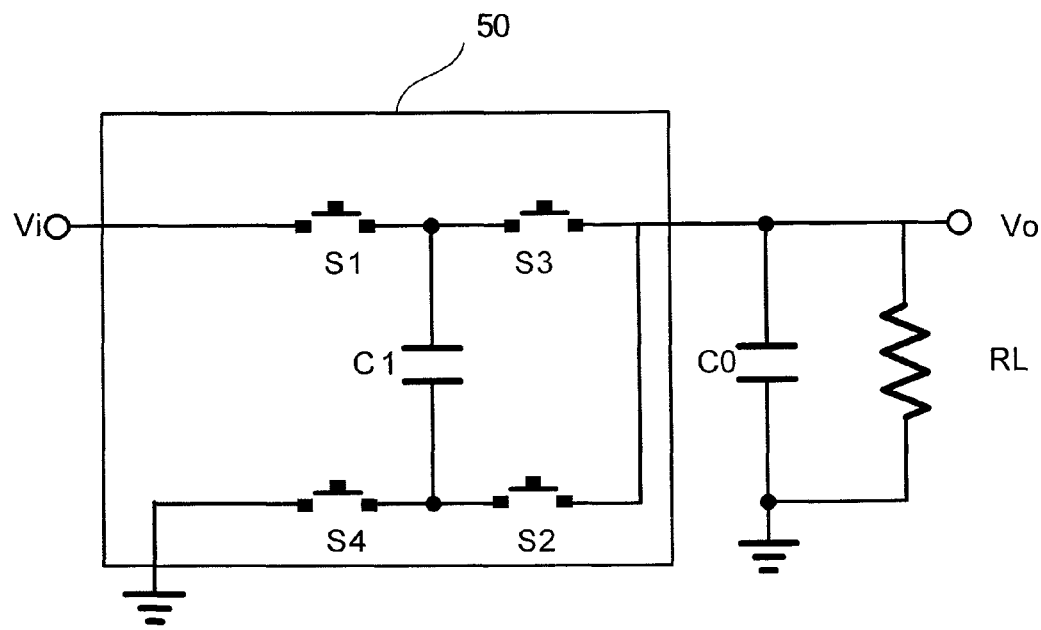
FIG. 1B is a circuit diagram of a conventional charge pump regulator.
Figure 1C:
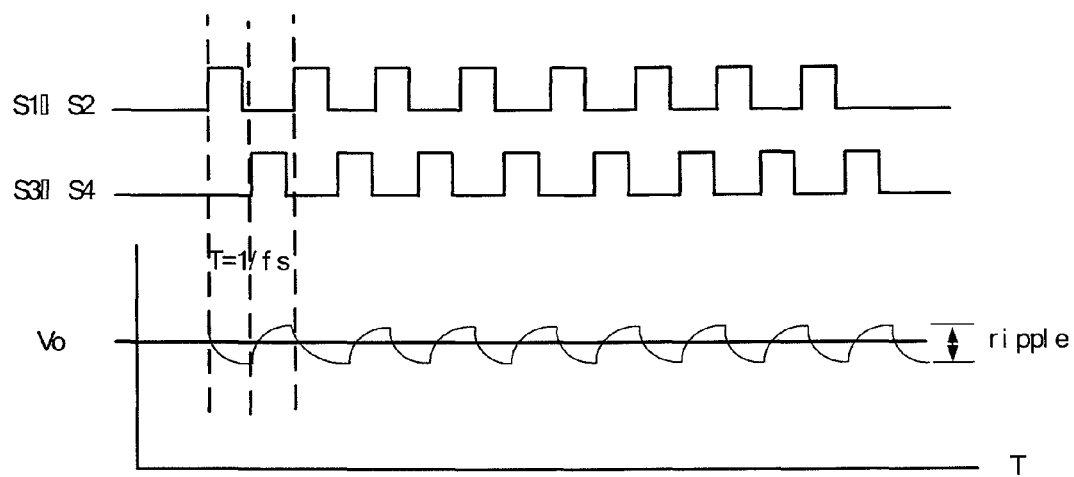
FIG. 1C is a timing diagram of a controller of the conventional charge pump regulator.
Figure 1D:
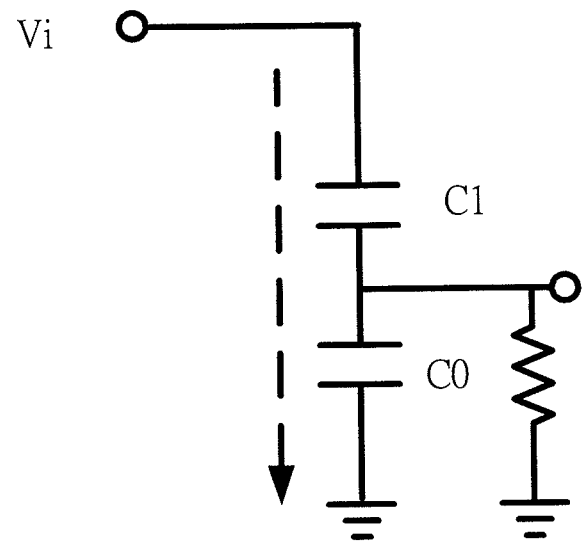
FIG. 1D is a charging circuit diagram of a conventional charge pump regulator.
Figure 1E:
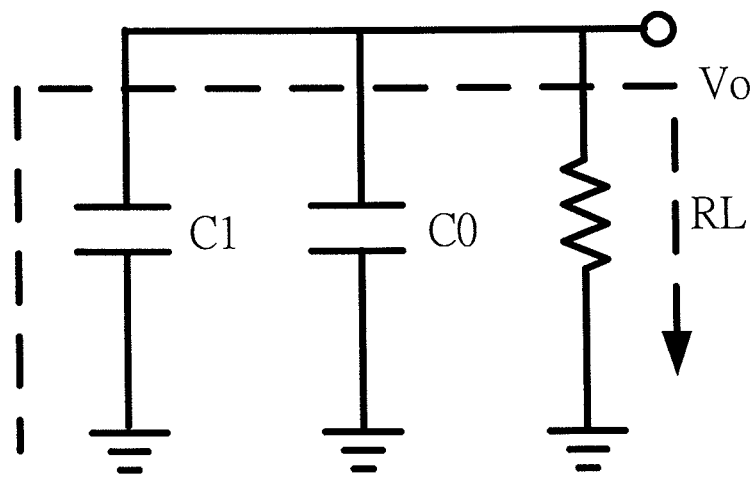
FIG. 1E is a discharging circuit diagram of a conventional charge pump regulator.

The charge pump unit 50 is compossited by a first switch S1, a second switch S2, a third switch S3, a fourth switch S4, and capacitor C1 (Please refer to FIG. 1B). The phase control unit 140 controls the charge pump unit 50 by generating a multiple phase control signal. That is, phase control unit 140 generates a first phase to close the switches S1 and S2, the input voltage Vi then charges capacitors C0 and C1, (Please refer to FIG. 1C). Next, the phase control unit 140 generates a second phase to close the switches S3 and S4, and the capacitor C1 then discharges to the load RL.

In the open loop system, the output voltage of the charge pump unit is unstable due to the variation of the load and the interference of high frequency noise. When the output voltage level is not stable, it is easier for the connected circuit to be damaged or to burn out. Due to the instability of the open loop schema, the disclosure uses close loop control to stabilize the output variation and exclude the effects of either noise interference or load variation. Furthermore, the disclosed compensation unit adopts a stabilizing method of a control system to compensate the charge pump regulator into a stable state. Consequently, the output voltage of the disclosed charge pump is able to generate the output voltage with a rapid speed and low ripple output voltage level. Generally, the stability method of a control system uses Bode plot with phase margin (PM) or gain margin (GM), or a Nyquist plot.

The modulation unit 130 of the charge pump feedback control device 100 further adopts a modulation signal to output at least one phase signal. The modulation signal is pulse frequency modulation (PFM) or pulse skipping modulation (PSM).

The phase control unit 140 is composed using multiple combinational logics, and used for synthesizing the modulation signal to the plurality of phase signals. Generally, the charge pump unit 50 composition is several capacitors and switches, which is designed according to boosting or bucking. The charge pump unit 50 switches according to the phase signal to charge/discharge the capacitors for boosting or bucking the output voltage.

Figure 3A:
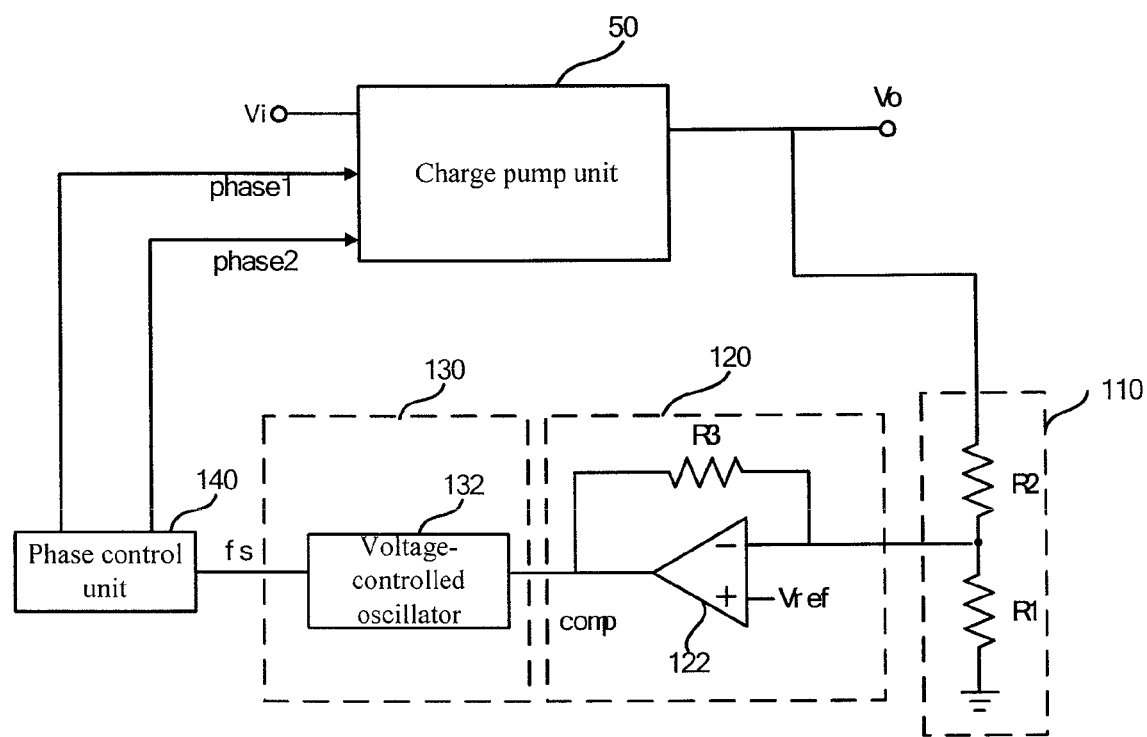
FIG. 3A is the first detailed functional block diagram of the embodiment of the disclosed charge pump feedback control device according to FIG. 2B.

Please refer to FIG. 3A, in which an exemplified diagram of PFM for the disclosed charge pump feedback control device is shown. The compensation unit 120 includes: a third resistor R3 (equivalent resistor), and differential amplifier 122. The differential amplifier 122 couples the voltage divider 110 and the third resistor R3. The positive input end of the amplifier 122 is coupled to the reference voltage Vref, and the differential amplifier 122 receives the divided voltage at the second resistor R2 to generate an error signal through stability compensation. The modulation unit 130 is a voltage controlled oscillator (VCO), which is coupled to the differential amplifier 122 for receiving the error signal, and generates the modulation signal using pulse frequency modulation (PFM) according to a voltage level of the error signal.

When input voltage Vi is equal to 3.3V and output voltage Vo is equal to 1.2V, the voltage divider 100 receives 1.2V from the output voltage and divides 1.2V by the first resistor R1 and the second resistor R2. The output voltage Verror1 of the differential amplifier 122 is calculated by Formula 5.

$$\frac{Vref - Verror}{R3} + \frac{Vref}{R1} + \frac{Vref - Vo}{R2} = 0 \qquad \text{F.5}$$

The F.5 derives $$Verror = \left(\frac{1}{R1} + \frac{1}{R1} + \frac{1}{R3}\right) * Vref * R3 - \frac{R3}{R2} * Vo.$$

When the load current increases, the impedance of the load decreases correspondently, the output voltage Vo decreases, then the error signal Verror increases derived by F.5. Conversely, when the load current decreases, the impedance of the load increases correspondently, the output voltage Vo increases, then the error signal Verror decreases derived by F.5.

Please refer to FIG. 3A, in which the modulation unit 130 is a voltage-controlled oscillator (VCO) 132. The voltage-controlled oscillator132 generates different frequencies according to the different voltage level of the compensation signal from the compensation unit 120.

Figure 3B:
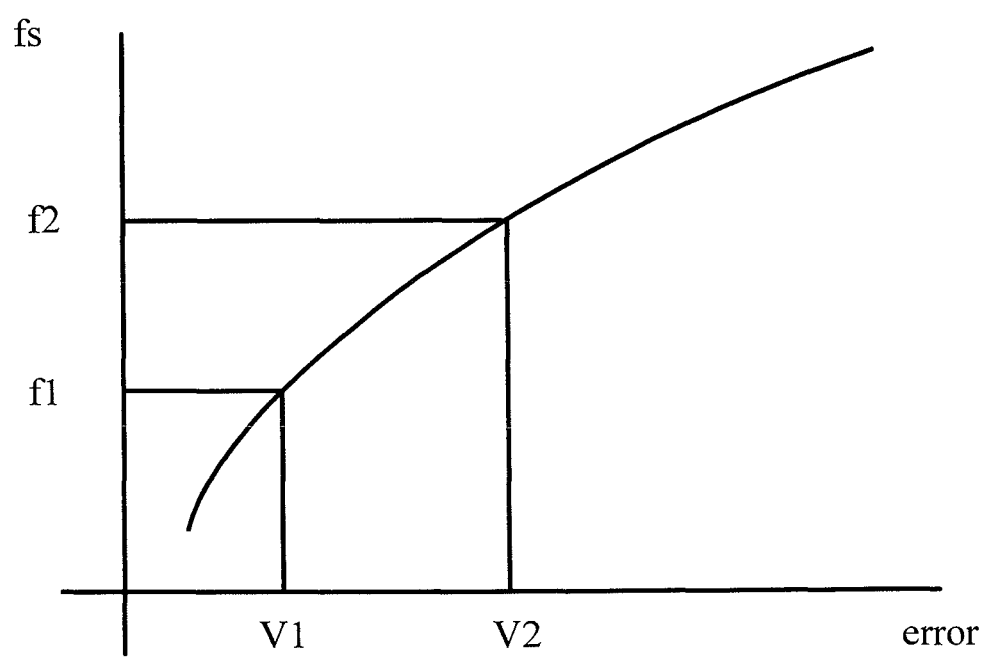
FIG. 3B is a voltage-frequency diagram of the VCO of the first example of the embodiment of the disclosed charge pump feedback control device according to FIG. 3A.
Figure 3C:
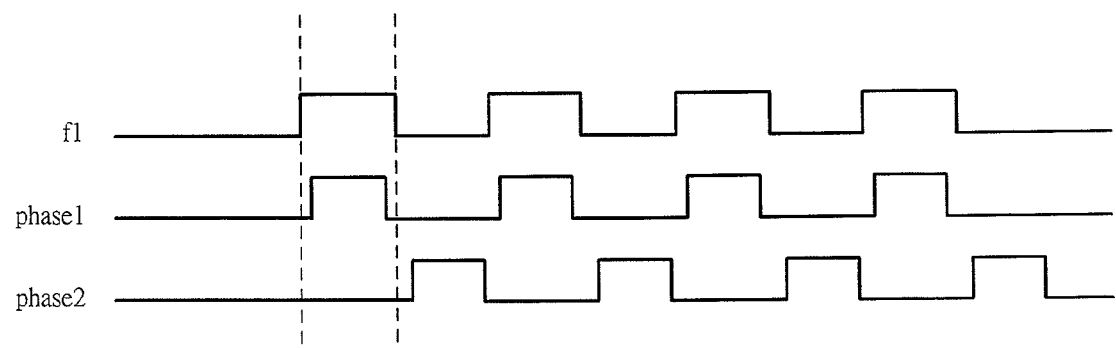
FIG. 3C is a first frequency timing diagram of a phase control unit of the first example of the embodiment of the disclosed charge pump feedback control device according to FIG. 3A.
Figure 3D:
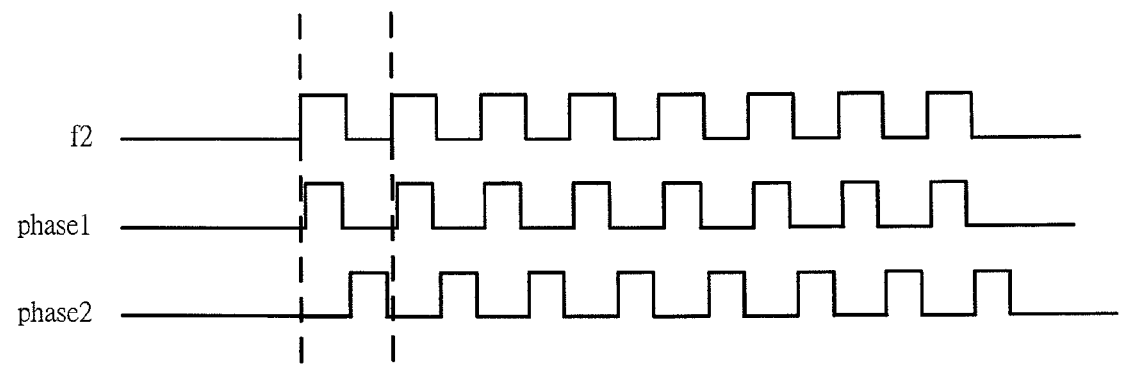
FIG. 3D is a second frequency timing diagram of a phase control unit of the first example of the embodiment of the disclosed charge pump feedback control device according to FIG. 3A.

Please refer to FIG. 3B, in which the X axis is voltage level of the error signal Error, and the Y axis is the output frequency of the voltage controlled oscillator 132. The voltage level of the error signal V1 corresponds to the frequency f1 of the modulation signal (Please refer to FIG. 3C), and the voltage level of the error signal V2 corresponds to the frequency f2 of the modulation signal (Please refer to FIG. 3D). When the voltage level of the error signal is lower, the correspondent frequency f1 of the modulation signal is slower; conversely, when the voltage level of the error signal is higher, the correspondent frequency f2 of the modulation signal is faster.

In the following paragraphs, the disclosure explains two examples of load variation under the PFM system.

Example 1

When the load current increases, the impedance of the load decreases correspondingly, and the output voltage Vo decreases. To sustain a stable output voltage, a voltage level of the error signal generated by sampling, dividing, and stability compensating the output voltage increases, which derives the output frequency of the voltage controlled oscillator 132 faster. For example, after the phase control unit 140 receives the output frequency is f2, it then uses the combinational logic to synthesize several phase signals, each of which has a different phase. Please refer to FIG. 3D, in which the phase signal f2 generated by the voltage controlled oscillator 132 is outputted to the phase control unit 140, a first phase signal phase 1 and a second phase signal phase 2 are generated for the charge pump unit 50. The first phase signal phase 1 and the second phase signal phase 2 are different in phase, and not synchronized. The first phase signal phase 1 controls the capacitor C1 of the charge pump unit 50 charged, and the second phase signal phase 2 controls the capacitor C1 discharging to the capacitor C0 and the load RL. From F.4, when the impedance of the load RL decreases, to sustain the gain ratio of the output voltage and the input voltage of the charge pump unit 50, adjusting the switching frequency fs of modulation signal to a higher level makes the output voltage more stable, and reduces the ripple of the output voltage at the same time.

Example 2

When the load current decreases, the impedance of the load increases correspondingly, and the output voltage Vo increases. To sustain a stable output voltage, a voltage level of the error signal generated by sampling, dividing, and stability compensating the output voltage decreases, which derives the output frequency of the voltage controlled oscillator 132 slower. For example, after the phase control unit 140 receives the output frequency is f1 then uses the combinational logic to synthesize as several phase signals, each of which has a different phase. Please refer to FIG. 3C, in which the phase signal f1 generated by the voltage controlled oscillator 132 is outputted to the phase control unit 140, a first phase signal phase 1 and a second phase signal phase 2 are generated for the charge pump unit 50. The first phase signal phase 1 and the second phase signal phase 2 are different in phase and not synchronized. The first phase signal phase 1 controls the capacitor C1 of the charge pump unit 50 charged, and the second phase signal phase 2 controls the capacitor C1 discharging to the capacitor C0 and the load RL. From F.4, when the impedance of the load RL increases, to sustain the gain ratio of the output voltage and the input voltage of the charge pump unit 50, adjusting the switching frequency fs of modulation signal to a lower level makes the output voltage more stable, and reduces the ripple of the output voltage at the same time.

Please note that the error signal generated by the compensation unit 120 is a voltage signal, and the modulation unit 130 is a voltage controlled oscillator (VCO). The modulation signal corresponding to the VCO is a pulse frequency modulation (PFM) signal. However, in the other embodiment, the error signal generated by the compensation unit 120 is a current signal, and the modulation unit 130 is a current controlled oscillator (CCO). The CCO receives a current signal and generates a modulation signal correspondently, which is also a PFM signal.

Figure 4A:
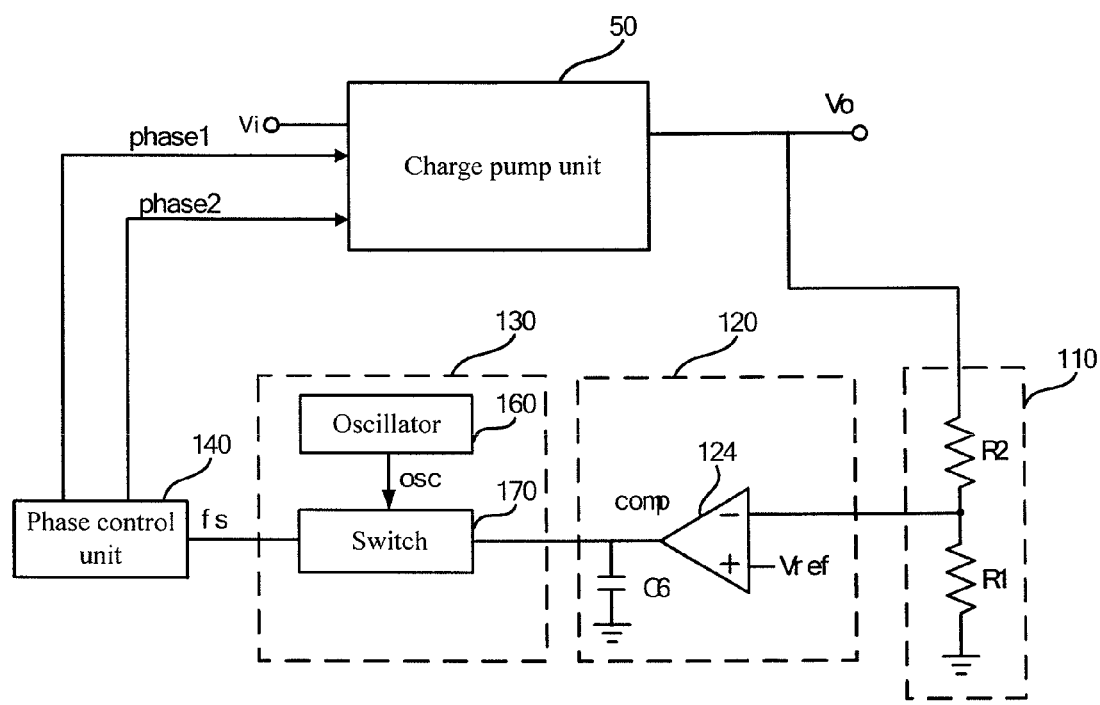
FIG. 4A is the second detailed functional block diagram of the embodiment of the disclosed charge pump feedback control device according to FIG. 2B.

Please refer to FIG. 4A, which is a diagram different from FIG. 3A in modulation schema; that is, the embodiment depicted in FIG. 4A adopts a pulse skipping modulation (PSM) to control the charge pump unit 50. The compensation unit 120 in FIG. 4A includes: a comparator 124. The comparator 124 is coupled to the charge pump unit 50. The modulation unit 130 includes: an oscillator 160 and a switch 170. The oscillator 160 generates an oscillation frequency. The switch 170 is coupled to the comparator 124 and the oscillator 160. The oscillation signal generated by the oscillator 160 passes when the comparative signal is at a high voltage level, and cuts off when the comparative signal is at low voltage level so as to generate the modulation signal of PSM.

Figure 4B:
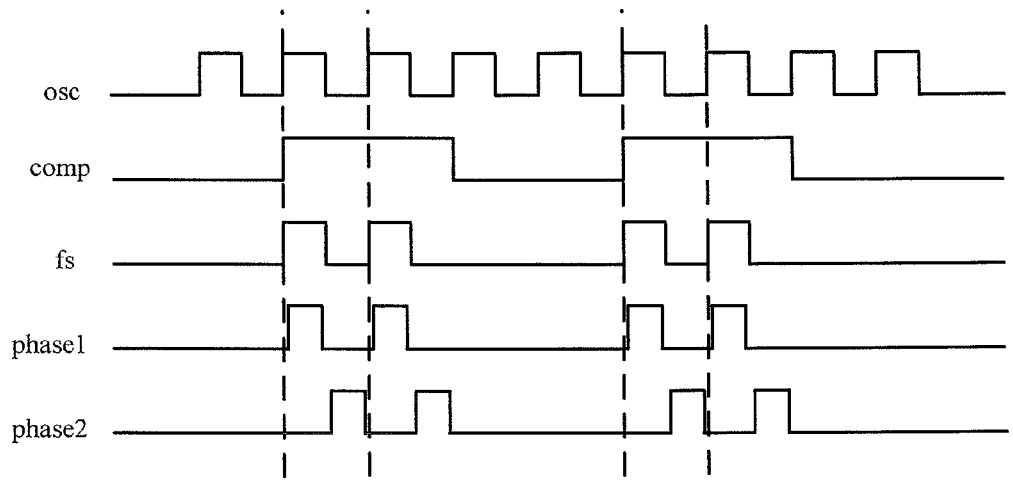
FIG. 4B is a first phase control timing diagram of the second example of the embodiment of the disclosed charge pump feedback control device according to FIG. 4A.

Please refer to FIG. 4A., in which when the voltage divider 110 receives the output voltage generated by the charge pump unit 50, a dividing voltage is generated by the voltage divider 110 and outputted to be compared with a reference voltage by the comparator 124. Please refer to FIG. 4B, in which when the dividing voltage is smaller than the reference voltage, the comparator 124 generates an output signal comp as high voltage level. Conversely, the comparator 124 generates the output signal comp as low voltage level when the dividing voltage is higher than the reference voltage. The switch bypasses the frequency generated by the oscillator 160 when the output signal generated by the comparator 124 is at a high voltage level; the switching frequency fs of modulation signal is therefore generated, which is a PSM signal. In this case, the value of the square wave of the switching frequency fs of modulation signal is 2 during the output signal comp is at a high voltage level. The phase control unit 140 receives the switching frequency fs of modulation signal to generate a first phase signal phase 1 and a second phase signal phase2. The first phase signal phase1 controls the input voltage Vi charging the capacitor C1 of the charge pump unit 50 Conversely, the second phase signal phase2 control the capacitor C1 discharging to the capacitor C0 and the load RL.

Two load variation examples are illustrated in the following paragraphs for a PSM modulation system.

Example 1

Figure 4C:
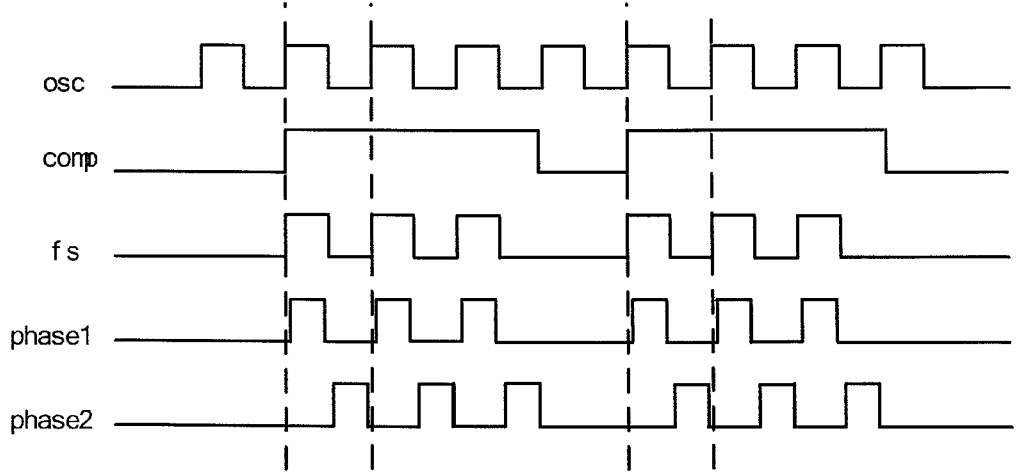
FIG. 4C is a second phase control timing diagram of the second example of the embodiment of the disclosed charge pump feedback control device according to FIG. 4A.

When the load current increases, the impedance of the load decreases correspondingly, and the dividing voltage decreases following the output voltage Vo decreases. Therefore, when the dividing voltage is lower than the reference voltage, the output signal comp of the comparator 124 is set as high voltage level. The time interval of the high voltage level of the output signal comp in FIG. 4C is longer than that in FIG. 4B, and the value of the square wave of the switching frequency fs of modulation signal is 3 during the output signal comp is at a high voltage level, which is more than that in FIG. 4B. The phase control unit 140 receives the phase and frequency of the switching frequency fs of modulation signal and synthesizes as at least one phase signal through a combinational logic. Each of the at least one phase signal is independent. Please refer to FIG. 4C, in which the phase control unit 140 utilizes the phase signal of the switching frequency fs of modulation signal to generate a first phase signal phase 1 and a second phase signal phase2. The charge/discharge speeds of the charge pump unit 50 increases due to receiving a greater value of square wave of the first phase signal phase 1 and the second phase signal phase2. From F. 4, to sustain the gain ratio of the output voltage and the input voltage of the charge pump unit 50, it is clear that when the load RL changes, increasing the amount of the square wave of the switching frequency fs of modulation signal is necessary for the stability of the output voltage.

Example 2

Figure 4D:
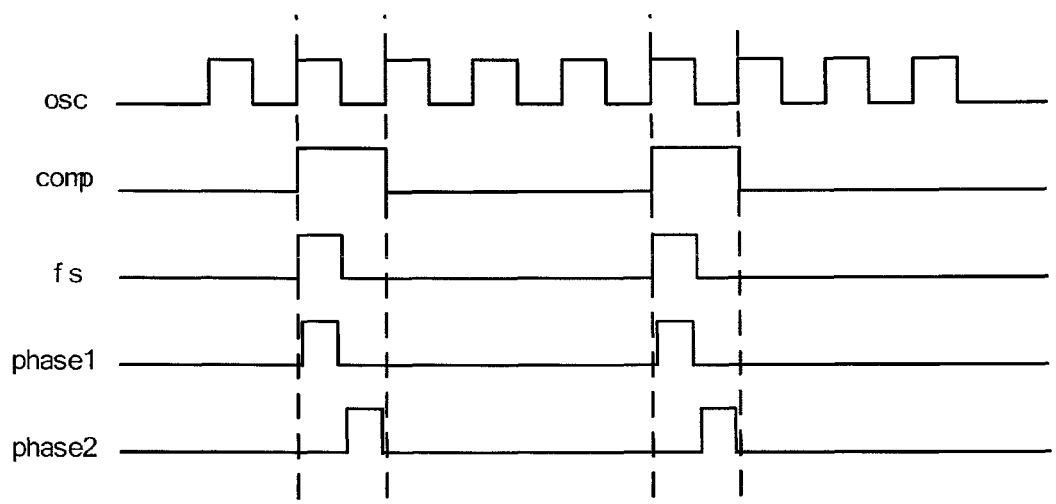
FIG. 4D is a third phase control timing diagram of the second example of the embodiment of the disclosed charge pump feedback control device according to FIG. 4A.

When the load current decreases, the impedance of the load increases correspondingly, and the dividing voltage increases following the output voltage Vo increases. Therefore, when the dividing voltage is greater than the reference voltage, the output signal comp of the comparator 124 is set at a low voltage level. The time interval of the high voltage level of the output signal comp in FIG. 4D is shorter than that in FIG. 4C, and the value of the square wave of the switching frequency fs of modulation signal is 1 while the output signal comp is at a high voltage level, which is less than the one in FIG. 4B. The phase control unit 140 receives the phase and frequency of the switching frequency fs of modulation signal and synthesizes as at least one phase signal through a combinational logic. Each of the at least one phase signal is independent. Please refer to FIG. 4D, in which the phase control unit 140 utilizes the phase signal of the switching frequency fs of modulation signal to generate a first phase signal phase1 and a second phase signal phase2. The charge/discharge speeds of the charge pump unit 50 decreases due to receiving a lower value of square wave of the first phase signal phase 1 and the second phase signal phase2. From F.4, to sustain the gain ratio of the output voltage and the input voltage of the charge pump unit 50, it is clear that when the load RL changes, reducing the value of the square wave of the switching frequency fs of modulation signal is necessary for the stability of the output voltage.

Please note that the compensation unit 120 compensates the charge pump regulator to improve the relative stability of the whole system. The system becomes stable rather than unstable, or more stable than the original system. The compensation circuit is used for PFM schema rather for the PSM schema, because the PSM schema uses the comparator mechanism. The compensation unit 120 is not limited by the examples in FIG. 3A and FIG. 4A; any other architectures improving the close loop stability is also able to be used for the disclosure.

Figure 5A:
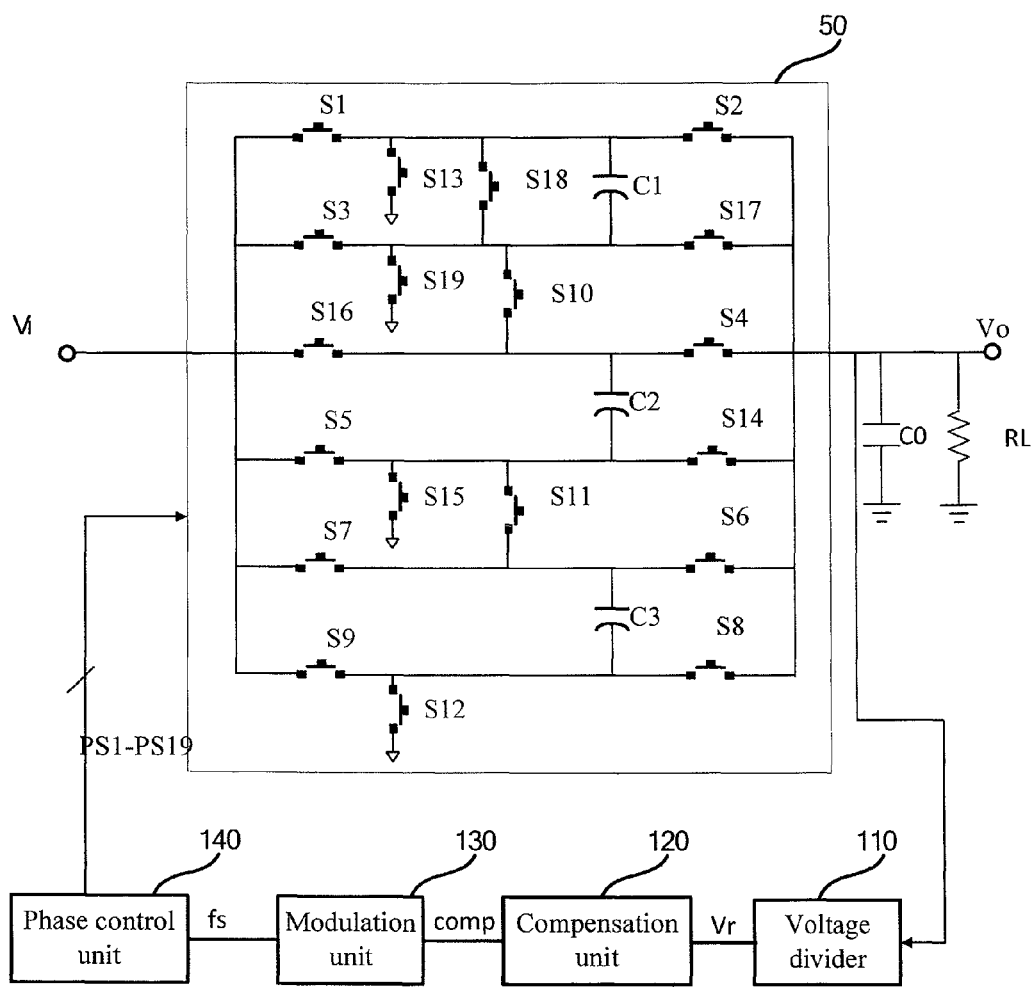
FIG. 5A is the third detailed functional block diagram of the embodiment of the disclosed charge pump feedback control device according to FIG. 2B.

Please refer to FIG. 5A, in which the phase control unit 140 receives the switching frequency fs of modulation signal and adjusts the switch in FIG. 5A according to the output voltage to boost or buck the output voltage for a constant voltage level.

Please refer to FIG. 5A, in which the charge pump unit 50 has 3 capacitors and 19 switches. By controlling the 19 switches, the capacitors are charged or discharged to derive a gain ratio of the output voltage and the input voltage. The gain ratios of the schema are the multiple of 2, 1, 1/2, 3/2, 2/3, 4/3, 3/4.

Following are two examples descriptive of the embodiment in FIG. 5A, which perform boosting/bucking of the output voltage to 3.3V.

Example 1

Boosting

Figure 5B:
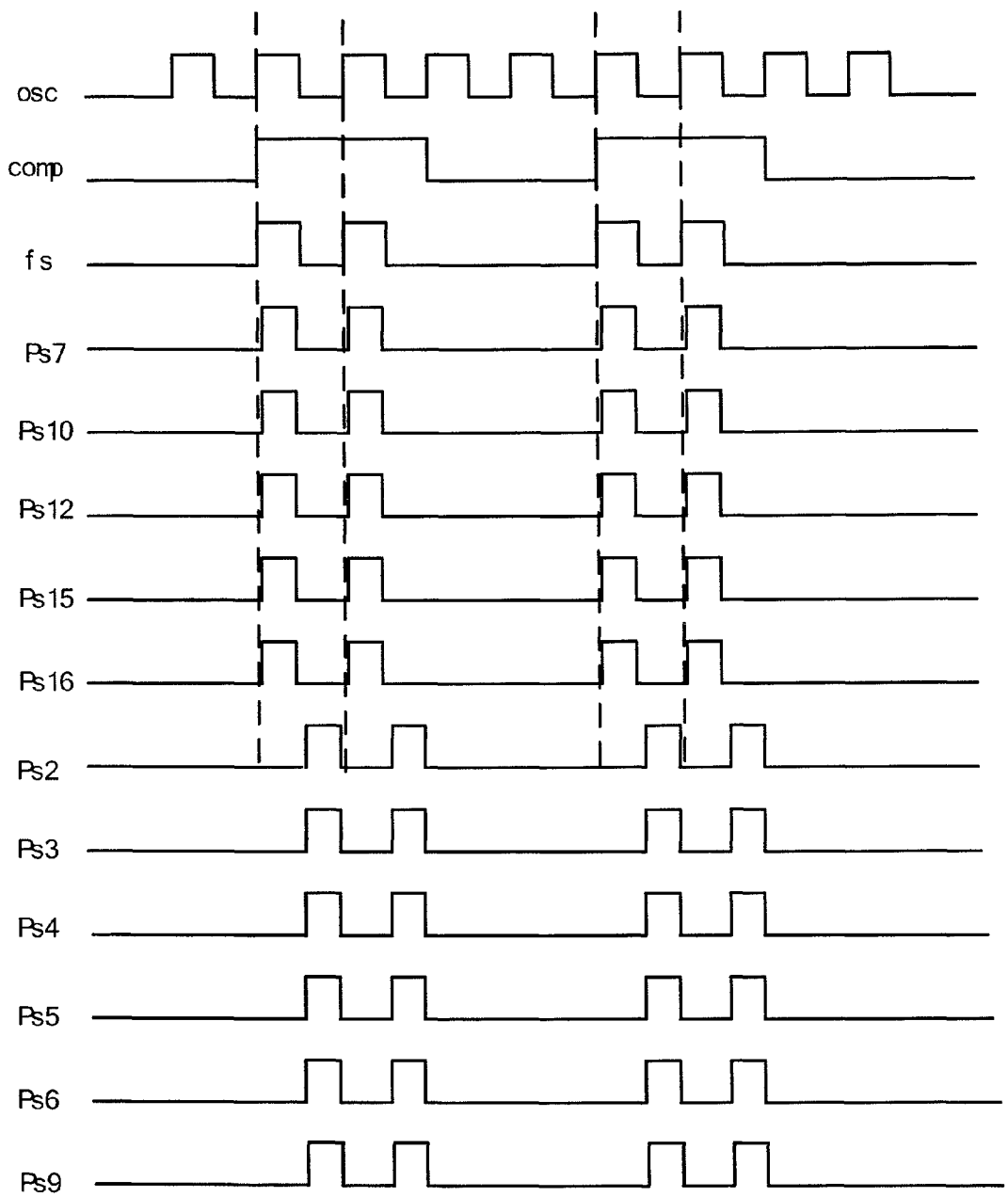
FIG. 5B is a boosting timing diagram of the third example of the embodiment of the disclosed charge pump feedback control device according to FIG. 5A.

When the input voltage is 1.65V, the charge pump unit 50 boosts the output voltage to 3.3V. The output voltage of the charge pump unit 50 is set as 2 times of the input voltage. Please refer to FIG. 5B, in which in the phase timing diagram, the phase control unit 140 receives the switching frequency fs of modulation signal, and outputs the phase signals Ps7, Ps10, Ps12, Ps15, and Ps16 to control the switches S7, S10, S12, S15, and S16 of the charge pump unit 50. This is called a gain phase control mode, in which the input voltage Vi charges the capacitors C2 and C3. If the output phase signals are Ps2, Ps3, Ps4, Ps5, Ps6, and Ps9, the switches S2, S3, S4, S5, S6, and S9 of the charge pump unit 50 are closed. This is called a common phase control mode, in which the capacitors C1, C2, and C3 discharge to the capacitor C0.

Please refer to the following derivations.

Figure 5C:
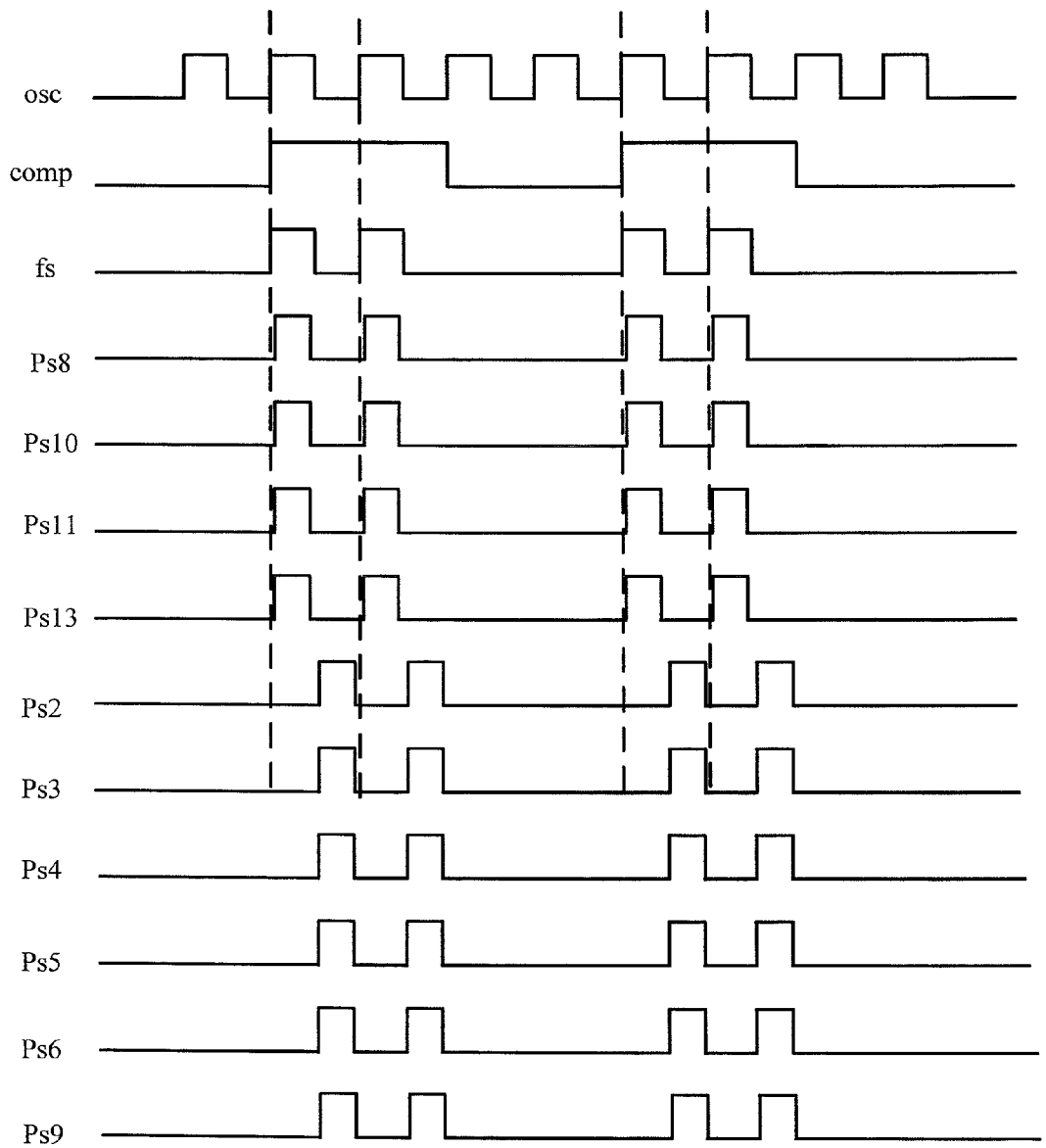
FIG. 5C is a bucking timing diagram of the third example of the embodiment of the disclosed charge pump feedback control device according to FIG. 5A.
Figure 5D:
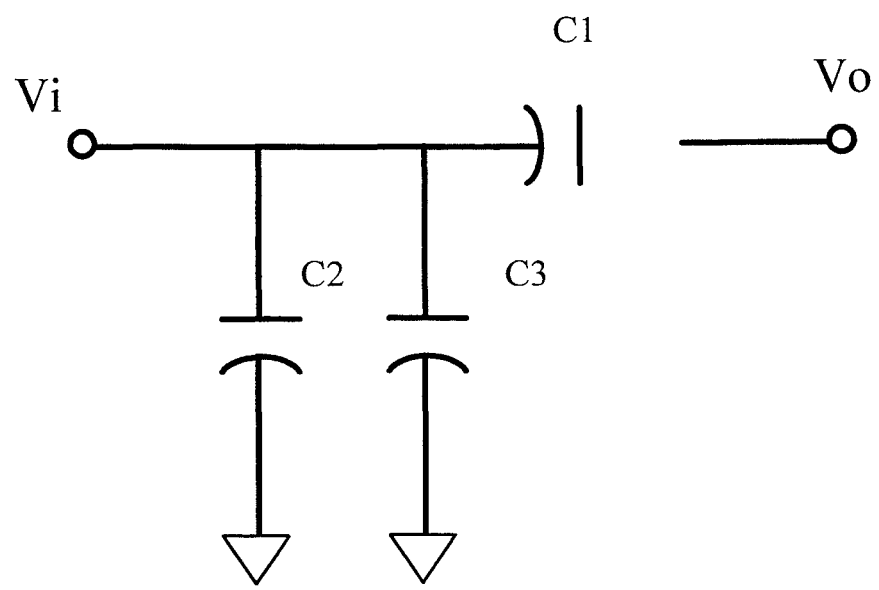
FIG. 5D is a boosting gain/phase control diagram of the third example of the embodiment of the disclosed charge pump feedback control device according to FIG. 5A.
Figure 5E:
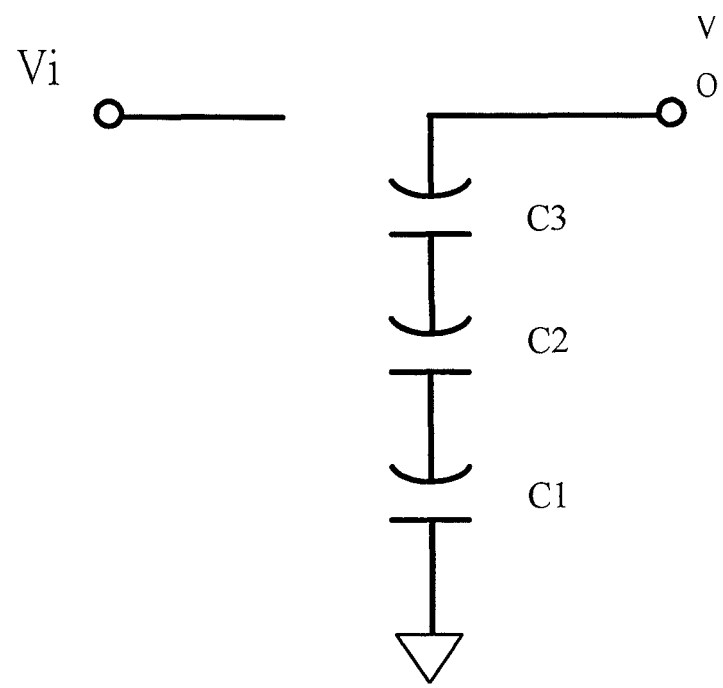
FIG. 5E is a bucking gain/phase control diagram of the third example of the embodiment of the disclosed charge pump feedback control device according to FIG. 5A.

Please refer to FIG. 5D, in which is a gain phase control mode, the voltage level of the capacitor C2 is Vc2, the voltage level of the capacitor C3 is Vc3, and Vc2=Vc3=Vi.

Figure 5F:
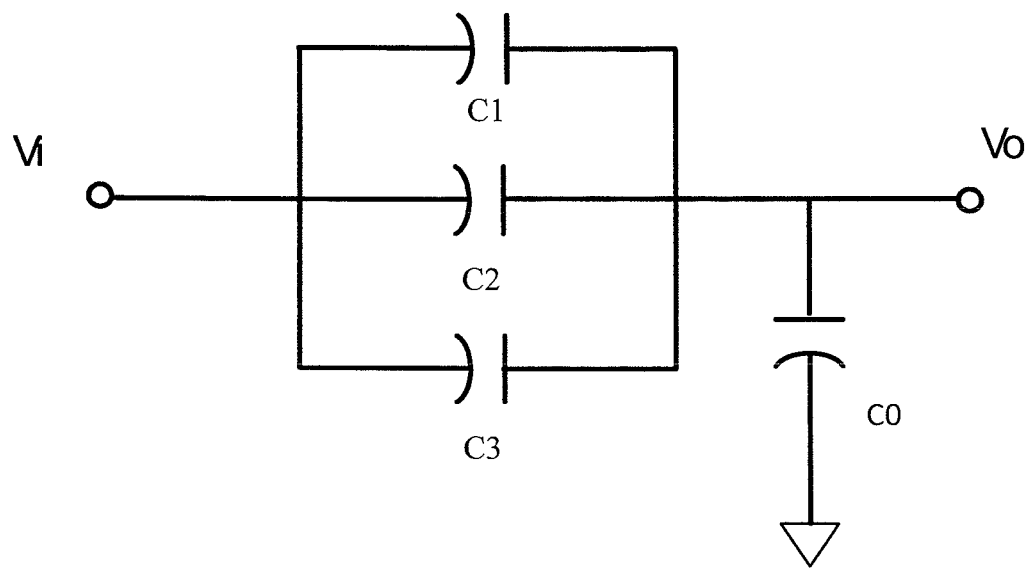
FIG. 5F is a common phase control diagram of the third example of the embodiment of the disclosed charge pump feedback control device according to FIG. 5A.

Please refer to FIG. 5F, in which is a common phase control mode, Vo=Vc3+Vi, due to Vc3 is equal to Vi, Vo=2*Vi, Vo/Vi=gain=2. Therefore, when the input voltage Vi is equal to 1.65V, the output voltage Vo=2*1.65=3.3V.

Example 2

Bucking

When the input voltage is 4.4V, the charge pump unit 50 bucks the output voltage to 3.3V. The output voltage of the charge pump unit 50 is set to ¾ of the input voltage. Please refer to FIG. 5C, in which in a phase timing diagram, the phase control unit 140 receives the switching frequency fs of modulation signal, and outputs the phase signals Ps8, Ps11, Ps10, and Ps13 to control the switches S8, S11, S10, and S13 of the charge pump unit 50. This is called a gain phase control mode, in which the capacitors C1, C2 and C3 charge to the output voltage Vo. If the output phase signals are Ps2, Ps3, Ps4, Ps5, Ps6, and Ps9, the switches S2, S3, S4, S5, S6, and S9 of the charge pump unit 50 are closed. This is called a common phase control mode, in which the capacitors C1, C2, and C3 discharge to the capacitor C0.

Please refer to the following derivations.

Please refer to FIG. 5D, in which in a gain phase control mode, the voltage level of the capacitor C2 is Vc2, the voltage level of the capacitor C3 is Vc3, and Vc1=Vc2=Vc3=⅓Vo.

Please refer to FIG. 5F, in which in a common phase control mode, Vo=Vc1+Vi=−⅓Vo+Vi, due to Vo+⅓Vo=Vin, Vo=¾*Vi, Vo/Vi=gain=¾. Therefore, when the input voltage Vi is equal to 4.4V, the output voltage V0=¾*4.4=3.3V.

Please note that the disclosure improves the load adaptive rate and linear adaptive rate of the charge pump regulator. Usually, the output voltage changes correspondently when the load changes. Through the modulation signal generated by the feedback control, the disclosure decreases the ripple voltage of the output voltage and gains a better output current range (Ex. 1 mA~100 mA). Therefore, in the situation of voltage variation, ΔVo is lower than ever, and the current variation ΔIo is greater than ever; the disclosure is therefore able to gain a better load adaptive rate. Even if the input voltage changes over time, the charge pump regulator adopting the disclosure is able to sustain a stable output voltage.

Figure 6A:
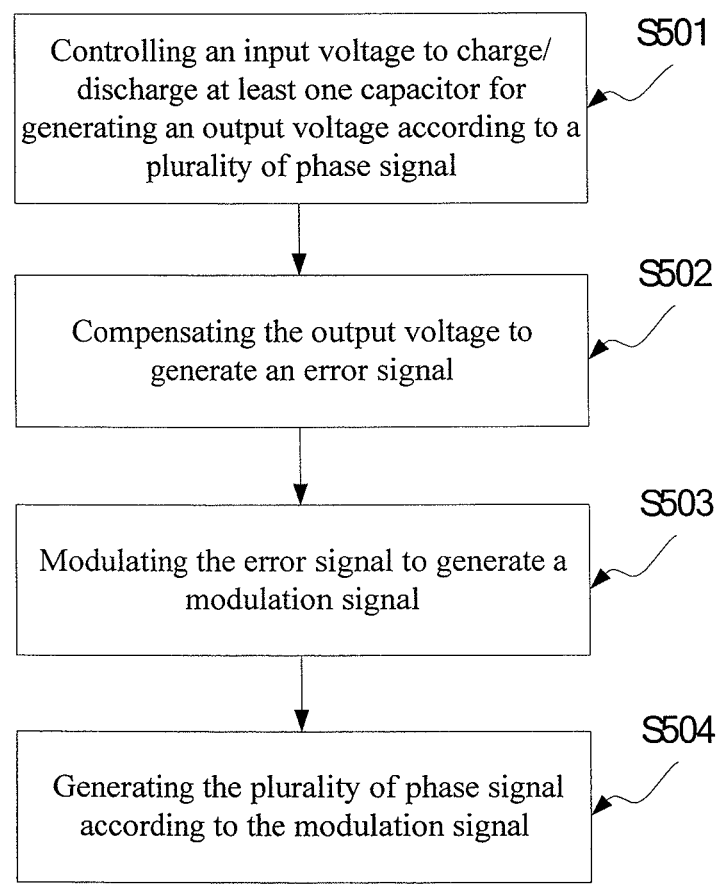
FIG. 6A is the exemplified flow chart of the embodiment of the disclosed method for feedback control of a charge pump.

Please refer to FIG. 6A, in which in the exemplified flow chart of the method for feedback control of charge pump in the disclosure, the steps are as follows:

In Step 501: Controlling an input voltage to charge/discharge at least one capacitor for generating an output voltage according to multiple phase signals.

In Step 502: Compensating the output voltage to generate an error signal.

In Step 503: Modulating the error signal to generate a modulation signal.

In Step 504: Generating the plurality of phase signal according to the modulation signal.

The modulation signal is a pulse frequency modulation signal, which utilizes a voltage controlled oscillator to modulate the input voltage according to the error signal. The error signal is an analog signal. The stability is gained by continuously adjusting the oscillation frequencies.

Figure 6B:
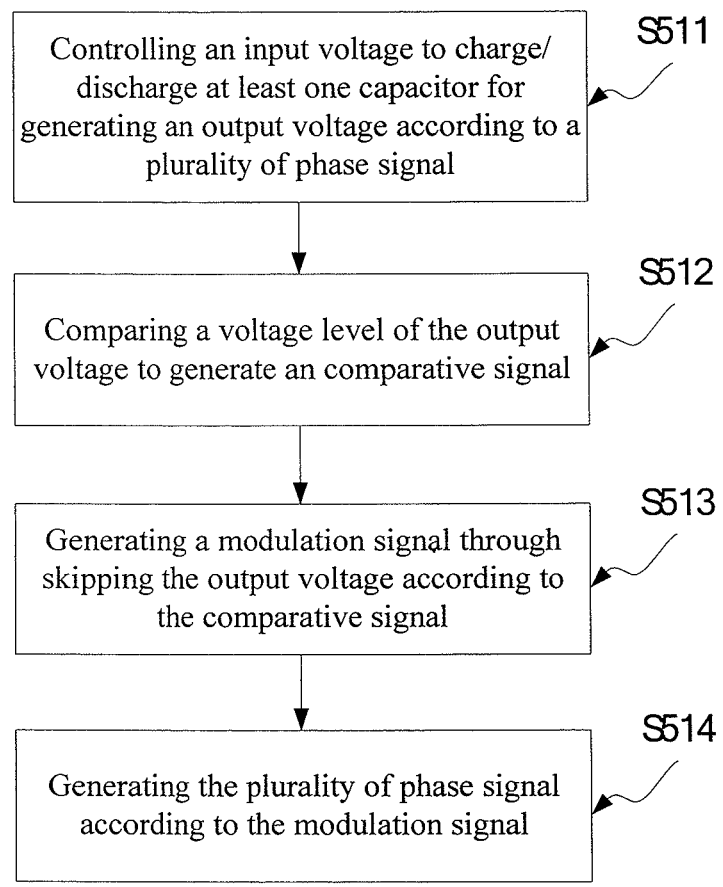
FIG. 6B is the other exemplified flow chart of the embodiment of the disclosed method for feedback control of a charge pump.

Please refer to FIG. 6B, in which is another exemplified flow chart of the method for feedback control of charge pump in the disclosure, the steps of which are as follows:

In Step 511: Controlling an input voltage to charge/discharge at least one capacitor to generate an output voltage according to multiple phase signals.

In Step 512: Comparing a voltage level of the output voltage to generate a comparative signal.

In Step 513: Generating a modulation signal through skipping the output voltage according to the comparative signal.

In Step 514: Generating the plurality of phase signals according to the modulation signal.

The modulation signal is a pulse skipping modulation signal, which is performed by a switch controlled by a voltage level of the comparative signal, the modulation signal being sent when the comparative signal is at a high voltage level, and the modulation signal being cut off when the comparative signal is at low voltage level.

Please note that, in comparison with the conventional charge pump regulator, the disclosure improves the load adaptive rate and linear adaptive rate of the charge pump regulator. Furthermore, the closed loop control design of the disclosure has a more stable output voltage and lower ripple. Additionally, the disclosure uses a compensation unit to improve the stability of the charge pump feedback control device, resulting in a faster system response. Practically, the disclosure improves the stability issue of the conventional schema, and the ripple range of the output voltage. The disclosure utilizes a modulation unit and modulation method to generate multiple phase signals to control the plurality of switches and at least one capacitor of the charge pump unit, the capacitor then being charged or discharged to generate the output voltage. The detail of boosting or bucking the charge pump and the schema of the charge pump is easily understood by those skilled in the art, and has therefore not been illustrated in the disclosure.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A device coupled to a charge pump unit for feedback control, the charge pump unit comprising a plurality of switches and at least one capacitor, and also receiving an input voltage so as to generate an output voltage, the device comprising:
    a compensation unit coupled to the charge pump unit, receiving the output voltage and generating an error signal accordingly, the compensation unit comprising:
        an impedance; and
        an amplifier, the amplifier comprising:
            an output end;
            a positive input end, coupled to a reference voltage; and
            a negative input end, coupled to the charge pump unit and a modulation unit,
        wherein the impedance couples across the negative end and the output end of the amplifier, and compensates the output voltage for stability to generate the error signal;
    the modulation unit, coupled to the compensation unit, receiving and modulating the error signal, and correspondingly generating a modulation signal, wherein the modulation unit is a voltage controlled oscillator (VCO), coupled to the compensation unit for receiving the error signal, and generating the modulation signal using pulse frequency modulation according to the error signal; and
    a phase control unit, coupled between an input end of the charge pump unit and an output end of the modulation unit, the phase control unit receiving the modulation signal, generating a plurality of phase signals to control the switches of the charge pump unit so that the input voltage charge/discharge at least one of the capacitors of the charge pump unit and generating the output voltage accordingly, the plurality of generated phase signals comprising at least three separate phase signals generated based on the received modulation signal.

2. The charge pump feedback control device according to claim 1, further comprising:
    a voltage divider, coupled between the charge pump unit and the compensation unit, receiving the output voltage generated from the charge pump unit, and dividing the output voltage for the compensation unit.

3. The charge pump feedback control device according to claim 1, wherein the phase control unit is composed using a plurality of combinational logic, and used for synthesizing the modulation signal to the plurality of phase signals.

4. A method for feedback control of a charge pump unit, comprising:
    controlling an input voltage to charge/discharge at least a capacitor for generating an output voltage according to a plurality of phase signals, the plurality of phase signals comprising at least three separate phase signals;
    compensating the output voltage to generate an error signal, the compensating performed by a compensation unit coupled to the charge pump unit, wherein the compensation unit comprises:
        an impedance; and
        an amplifier, the amplifier comprising:
            an output end;
            a positive input end, coupled to a reference voltage; and
            a negative input end, coupled to the charge pump unit and a modulation unit,
        wherein the impedance couples across the negative end and the output end of the amplifier, and compensates the output voltage for stability to generate the error signal;
    modulating the error signal to generate a modulation signal, the modulating performed by the modulation unit, wherein the modulation unit is a voltage controlled oscillator (VCO), coupled to the compensation unit for receiving the error signal, and generating the modulation signal using pulse frequency modulation according to the error signal; and
    generating the plurality of phase signals according to the modulation signal.

5. The method for feedback control of charge pump according to claim 4, further comprises:
    dividing the output voltage.

6. The method for feedback control of charge pump according to claim 4, wherein the modulation signal is a pulse frequency modulation signal.

* * * * *